United States Patent
Pardini et al.

(10) Patent No.: US 11,657,159 B2
(45) Date of Patent: May 23, 2023

(54) IDENTIFYING SECURITY VULNERABILITIES USING MODELED ATTRIBUTE PROPAGATION

(71) Applicant: International Business Machines Corporation, Armonk, NY (US)

(72) Inventors: Matthew Michael Garcia Pardini, Middlesex, MA (US); Bodo Hoppe, Boeblingen (DE); Zoltan Tibor Hidvegi, Round Rock, TX (US); Michael P Mullen, Poughkeepsie, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 77 days.

(21) Appl. No.: 17/072,162

(22) Filed: Oct. 16, 2020

(65) Prior Publication Data

US 2022/0121752 A1    Apr. 21, 2022

(51) Int. Cl.
  *G06F 21/57*   (2013.01)
  *G06F 21/60*   (2013.01)
  *G06F 21/62*   (2013.01)
  *G06F 11/34*   (2006.01)
  *G06F 21/00*   (2013.01)

(52) U.S. Cl.
  CPC ........ *G06F 21/577* (2013.01); *G06F 11/3447* (2013.01); *G06F 21/606* (2013.01); *G06F 21/62* (2013.01)

(58) Field of Classification Search
  CPC ...... G06F 21/577; G06F 21/606; G06F 21/62; G06F 21/50; G06F 21/52; G06F 21/53; G06F 21/57; G06F 11/3447
  See application file for complete search history.

(56) References Cited

U.S. PATENT DOCUMENTS

| | | | |
|---|---|---|---|
| 7,526,799 B2 | 4/2009 | Birk et al. | |
| 8,141,100 B2 | 3/2012 | Ben-Natan et al. | |
| 8,468,244 B2 | 6/2013 | Redlich et al. | |
| 8,646,085 B2 | 2/2014 | Norrman et al. | |
| 2009/0150728 A1* | 6/2009 | Barlow | G06F 11/2294 714/E11.159 |

(Continued)

OTHER PUBLICATIONS

Anonymously, "Method of Integrating Security Scanning Results with a Threat Modeling Tool," Feb. 25, 2015. 6 Pages.

(Continued)

*Primary Examiner* — Edward Zee
(74) *Attorney, Agent, or Firm* — Cantor Colburn LLP; Jeffrey Ingalls (57) ABSTRACT

Aspects of the invention include systems and methods for to detecting security vulnerabilities using modeled attribute propagation. A non-limited example of a computer-implemented method includes generating a model of a device under test, the model comprising a data path similar to the device under test and an attribute network. The method further includes detecting protected data that is introduced into the model and marking the protected data with an attribute. An end point of the marked protected data is detected along the data path. In response to the end point being indicative of a vulnerability, an alert is issued.

17 Claims, 5 Drawing Sheets

(56) References Cited

U.S. PATENT DOCUMENTS

| | | | |
|---|---|---|---|
| 2011/0069626 A1* | 3/2011 | Sun .................... | H04L 43/55 |
| | | | 370/252 |
| 2011/0145918 A1* | 6/2011 | Jung .................... | G06F 21/552 |
| | | | 726/22 |
| 2013/0227714 A1* | 8/2013 | Gula .................... | H04L 63/1408 |
| | | | 726/32 |
| 2014/0137084 A1* | 5/2014 | Tripp .................... | G06F 11/3672 |
| | | | 717/132 |
| 2014/0222842 A1 | 8/2014 | Ben-Natan et al. | |

OTHER PUBLICATIONS

Anonymously, "Method to Automatically Generate a Security Test Policy Based on Threat Modeling," Feb. 25, 2015. 3 Pages.

Anonymously, "System, Method and Apparatus for Hybrid Prevention of Security Vulnerabilities Due to Race Conditions," Jul. 30, 2014. 5 Pages.

G. Elahi et al., "A Vulnerability-Centric Requirements Engineering Framework: Analyzing Security Attacks, Countermeasures, and Requirements Based on Vulnerabilities," 2017, 29 Pages.

VK. Saini et al., "Threat Modeling Using Attack Trees," Apr. 2008, 9 Pages.

W. Jimenez et al., "Software Vulnerabilities, Prevention and Detection Methods: A Review," 2017. 11 Pages.

* cited by examiner

FIG. 1

|   A   |   B   | Output |
|-------|-------|--------|
|   0   |   0   |   0    |
|   0   |   1   |   0    |
|   1   |   0   |   0    |
|   1   |   1   |   1    |
|   0   |   0   |   0    |
|   0   |   1   |   0    |
|   1   |   0   |   0    |
|   1   |   1   |   1    |
|   0   |   0   |   0    |
|   0   |   1   |   0    |
|   1   |   0   |   0    |
|   1   |   1   |   1    |
|   0   |   0   |   0    |
|   0   |   1   |   0    |
|   1   |   0   |   0    |
|   1   |   1   |   1    |

FIG. 2

| A | B | Output |
|---|---|---|
| 0 | 0 | 0 |
| 0 | 1 | 1 |
| 1 | 0 | 1 |
| 1 | 1 | 1 |
| 0 | <u>0</u> | <u>0</u> |
| 0 | <u>1</u> | <u>1</u> |
| 1 | <u>0</u> | 1 |
| 1 | <u>1</u> | 1 |
| <u>0</u> | 0 | <u>0</u> |
| <u>0</u> | 1 | 1 |
| <u>1</u> | 0 | <u>1</u> |
| <u>1</u> | 1 | 1 |
| <u>0</u> | <u>0</u> | <u>0</u> |
| <u>0</u> | <u>1</u> | <u>1</u> |
| <u>1</u> | <u>0</u> | <u>1</u> |
| <u>1</u> | <u>1</u> | <u>1</u> |

IDENTIFYING SECURITY VULNERABILITIES USING MODELED ATTRIBUTE PROPAGATION

BACKGROUND

The present invention generally relates to security analysis of a computer-based system and, more specifically, relates to identifying security vulnerabilities using modeled attribute propagation.

Software/hardware verification involves checking a large number of "properties," or verification objectives. Verification techniques are used for design analysis to expose vulnerabilities to a system. For example, in "equivalence checking," each primary output of the designs being equivalence-checked is compared for pair-wise equality: this entails a distinct property per primary output. Functional verification of hardware designs involves testing a large diversity of types of properties, ranging from low-level assertions to high level encompassing properties such as that an arbiter fairly grants requests of various priorities, and that certain input stimulus scenarios result in the specified output scenarios. Increasingly sophisticated techniques are being developed to take advantage of hardware and software vulnerabilities. Therefore, it is desirable that new techniques are devised to identify vulnerabilities prior to validation.

SUMMARY

Embodiments of the present invention are directed to detecting security vulnerabilities using modeled attribute propagation. A non-limiting example of a computer-implemented method includes generating a model of a device under test, the model comprising a data path similar to the device under test and an attribute network. The method further includes detecting protected data that is introduced into the model and marking the protected data with an attribute. An end point of the marked protected data is detected along the data path. In response to the end point being indicative of a vulnerability, an alert is issued.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled", and variations thereof describe having a communications path between two elements and do not imply a direct connection between the elements with no intervening elements/connections between them. All of these variations are considered a part of the specification.

DETAILED DESCRIPTION

One or more embodiments of the present invention provide systems and methods for identifying system vulnerabilities that expose protected data by generating a model of a design under test (DUT) and propagating attribute signals through the model to identify vulnerabilities. The systems and methods described herein do not require significant capital investment in a complex microarchitectural model or significant involvement by design engineers, and they can be implemented on top of an existing testing strategy.

Modern computing hardware and software are under constant threat of being compromised by bad actors attempting to steal data or load malicious software. Although engineers create designs and protocols to minimize vulnerabilities, as technology advances, new tools, and opportunities arise for bad actors searching for new methods to exploit system vulnerabilities. As bad actors become more sophisticated, they are able to exploit behavioral tendencies and microarchitectural flaws to access protected data from computing systems.

During a design process, engineers attempt to identify and mitigate any known or potential vulnerabilities of a product from known threats. Unfortunately, design specifications are non-trivial and not easy to conceptualize. Therefore, engineers often miss vulnerabilities or are unable to determine how a vulnerability would be exploited. Modeling techniques for identifying vulnerabilities are not adequate as they are often unable to readily establish that a properly functioning behavior is itself a vulnerability.

One or more embodiments of the present invention address one or more of the above-described shortcomings of the prior art by providing systems and methods, in which a microarchitecture-specific model of a DUT is generated. A stimulus introduces protected data and unprotected data to the model. Upon detection of any protected data, the model couples an attribute to the protected data. This enables a user to track the protected data in a manner that is similar to using ink to track a water flow to a crack in a basin of water. As the model simulates the data paths of the DUT, design engineers see the flow of protected data through the model in real-time. The engineers do not have to rely on generic microarchitecture-agnostic theories on where potential vulnerabilities exist; rather, the model shows where protected data may improperly remain or divert from an expected path.

Figure 1:
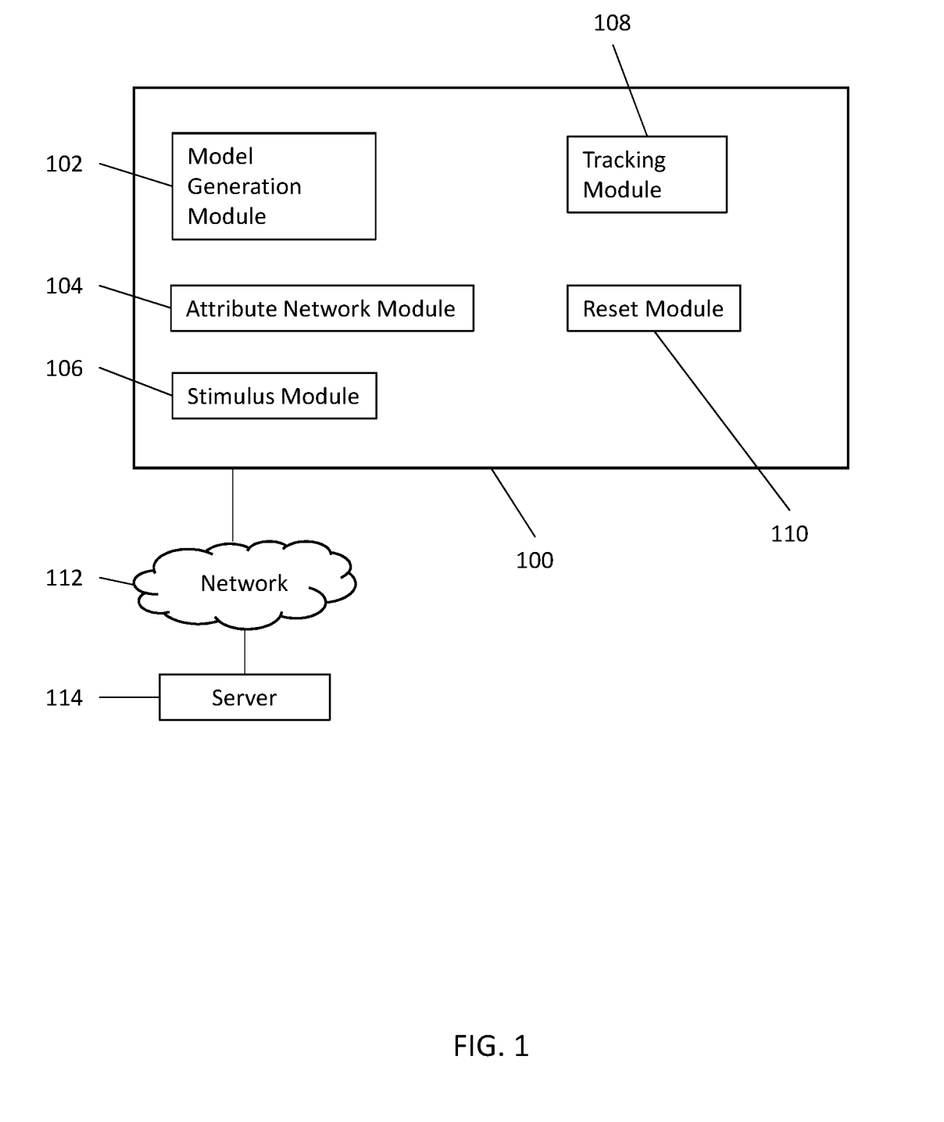
FIG. 1 illustrates a block diagram of components of a system for identifying vulnerabilities in accordance with one or more embodiments of the present invention.

Referring to FIG. 1, a system 100 for identifying vulnerabilities of a DUT is shown in accordance with one or more embodiments of the present invention. Using a hardware verification language (HVL), a model generation module 102 generates a model of a DUT for verification purposes. A DUT includes any hardware devices, processors, or any other appropriate computing device in need of verification. The model mimics the microarchitectural specifics of the DUT and has the same logical paths as the device under test. The microarchitecture includes the logical design of the components and the data paths of the DUT. In addition, the model mimics the behavior of the DUT. However, the model includes a parallel logical path for each signal propagating through the model.

An attribute network module 104 generates an attribute network, specific to the microarchitecture of the DUT. An attribute is a property or a characteristic of an entity or an object, including the protected data. An attribute includes one or more bits that the attributed network module 104 attaches to the protected data to distinguish protected data from unprotected data. Upon completion of generating the attribute network, a model compiler tool (not shown) combines the model with the attribute network. In some embodiments of the present invention, one path includes protected data with a first set of attribute bits, and a parallel path includes protected data with a second set of attribute bits. In other embodiments of the present invention, both parallel paths include the same set of protected data with attribute bits.

A stimulus module 106 provides the stimuli to the model. The stimuli include any stimuli that the DUT would be expected to receive. In some instances, the stimulus module 106 provides multiple stimuli to simulate stimuli received by the DUT in different states. As part of the stimuli, the stimulus module 106 provides the protected data to the model. The protected data includes data in many forms, including inputs, stored data, sequences, or other forms of protected data. The protected data is data that an unauthorized party does not have permission to read. The tracking module 108 monitors the model to detect the introduction of the protected data into the data stream. In some embodiments, of the present invention, the tracking module 108 is configured to recognize protected data and unprotected data. In other embodiments of the present invention, the tracking module 108 is configured to recognize protected data based on a security mitigation response to the introduction of the data into the model.

Due to instruction errors, contention events, prediction techniques, malicious software, or other happenings, a system may improperly introduce protected data into a system, permit an unauthorized user to read memory, or otherwise fail to safeguard protected data. For illustration purposes consider the following example of a potential exception event occurring during operation. A processor initiates a load operation for another resource and requests data from line A, which happens to be protected data, from the cache. The processor retrieves line A from the cache and transmits the data from line A to the other resource through its return data bus. Within a few clock cycles, the processor recognizes that the data in line A was protected data and should not have been transmitted it to the other resource and seeks to retrieve and/or delete the data or any data generated from the data in line A. At this point, the processor initiates a security mitigation process to delete, remove or otherwise protect the data or any data derived from the data. However, during those few clock cycles, a bad actor can use side channels to read the data from line A, or draw some inference from the data, or use the data as authorization to retrieve other protected data. In the event, the tracking module 108 is configured to recognize the protected data or identifies the protected data due to initiation of the security mitigation processes. The attribute network module 104 attaches attribute bit(s) to the data from Line A. Then, by searching for the attribute bit(s), the system 100 determines whether the protected data was deleted, remained in place, or moved through a different data path than in normal operation.

The reset module 110 permits a user to reset the one or more attributes during verification. In other words, a user can choose to remove one or more attributes from respective protected data, if the user no longer wants to track the protected data. The reset module also allows users to remove attribute bit(s) from particular protected data or reconfigure the attribute bit(s) during verification of the model. The system 100 is connected via a network 112 to a server 114, including a cloud computing server. The network 112 includes Ethernet, fiber optics, microwave, xDSL (Digital Subscriber Line), Wireless Local Area Network (WLAN) technology, wireless cellular technology, Bluetooth technology and/or any other appropriate technology.

Figure 2:
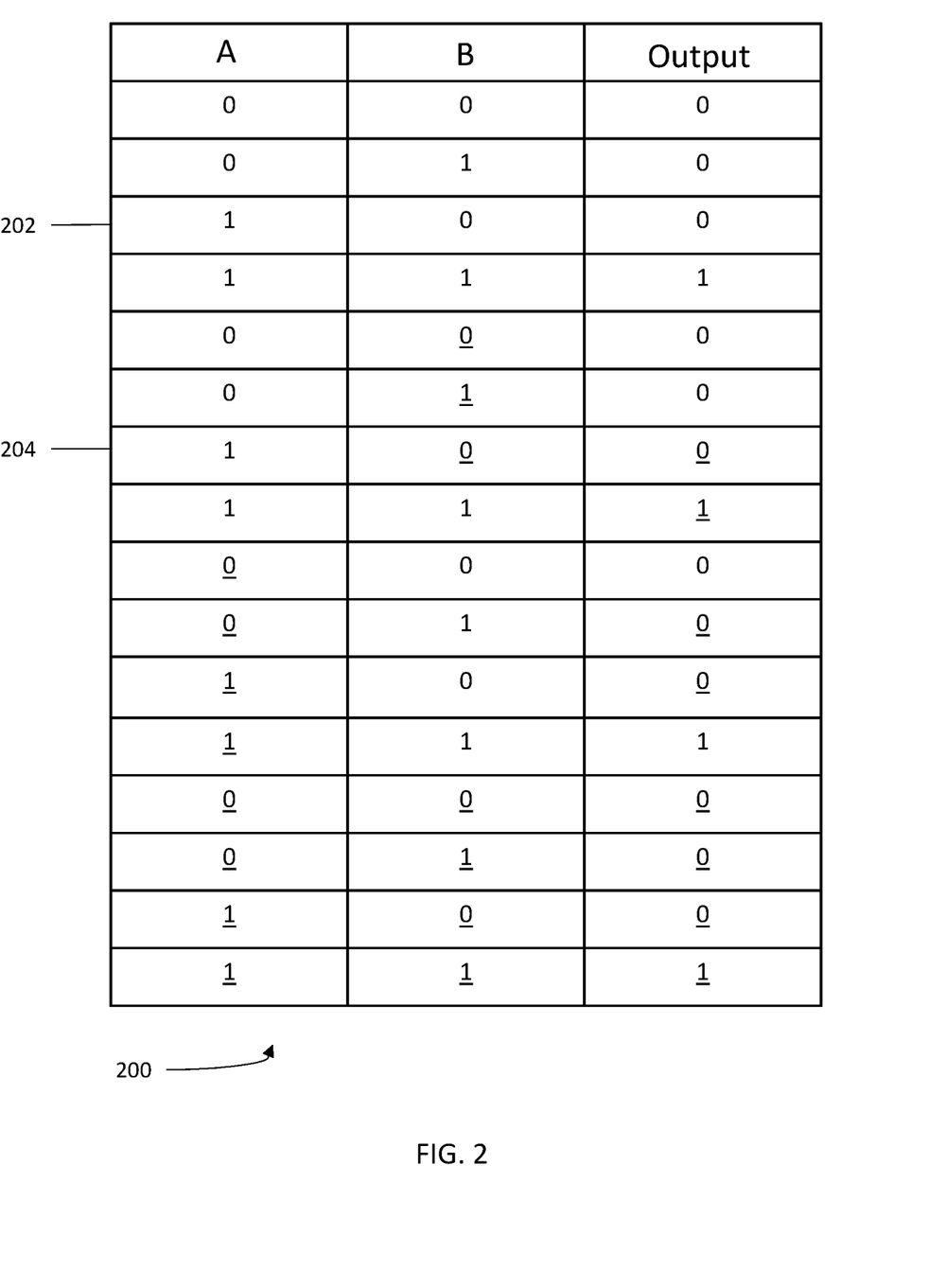
FIG. 2 illustrates an exemplary truth table for an AND gate in accordance with one or more embodiments of the present invention.

Referring to FIG. 2, a truth table for an AND gate is shown in accordance with one or more embodiments of the present invention. For illustrative purposes, attribute bits are denoted with an underline. For illustration, the differences between a first line 202 and a second line 204 are described. As for the first line 202, the AND gate takes a logical 1 and logical 0 as an input. The output is a logical 0. In this instance, no bit is an attribute bit. As for the second line 204, the AND gate accepts a logical 1 and a logical 0 attribute bit. In this instance, the output is a logical 0 attribute bit.

Figure 3:
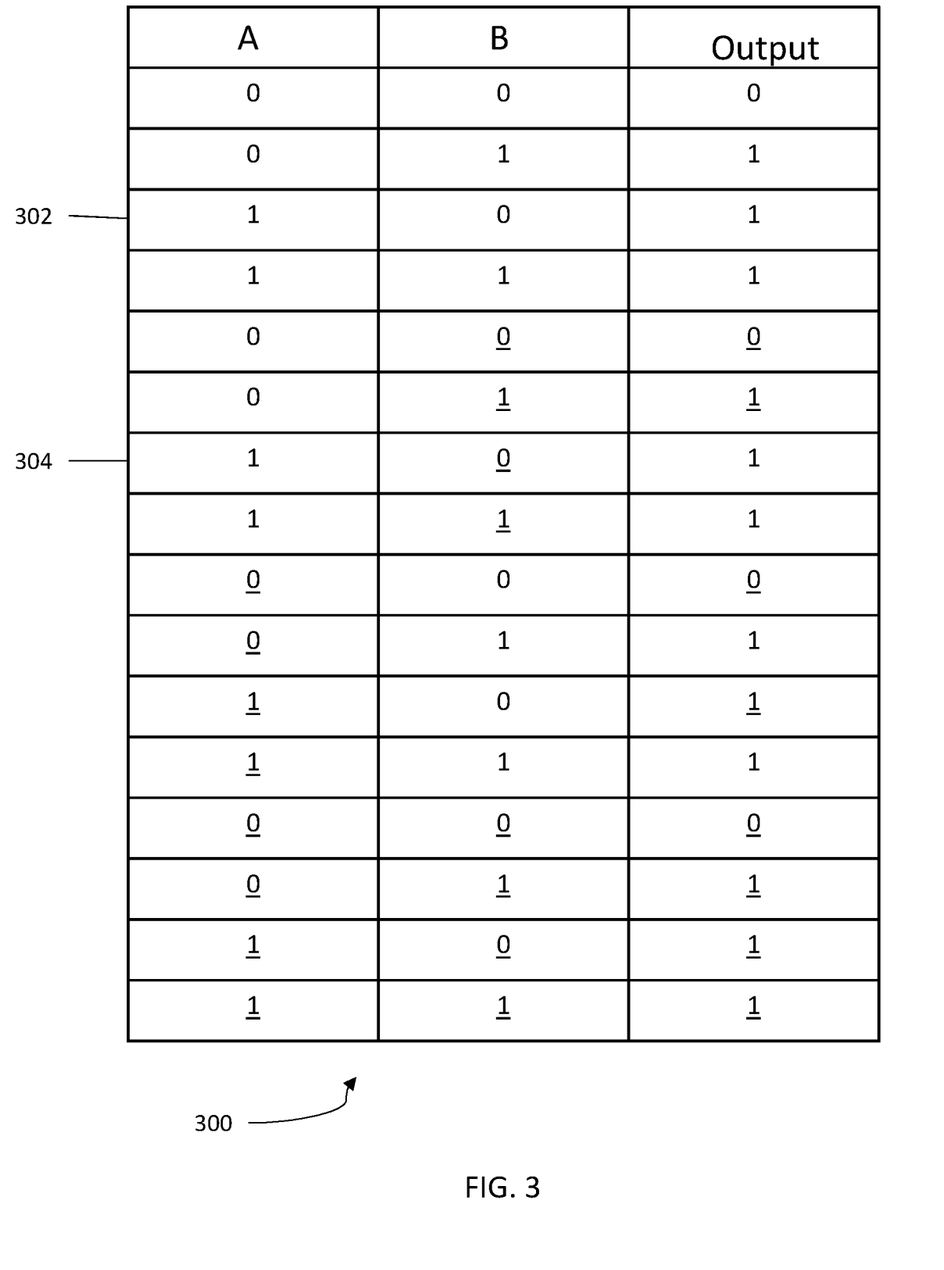
FIG. 3 illustrates an exemplary truth table for an OR gate in accordance with one or more embodiments of the present invention.

Referring to FIG. 3, a truth table for an OR gate is shown in accordance with one or more embodiments of the present invention. For illustrative purposes, attribute bits are denoted with an underline. For illustration, the differences between a first line 302 and a second line 304 are described. As for the first line 302, the OR gate takes a logical 1 and logical 0 as an input. The output is a logical 1. In this instance, no bit is an attribute bit. As for the second line 304, the OR gate accepts a logical 1 and a logical 0 attribute bit. In this instance, the output is a logical 1 that is not an attribute bit.

The DUT has security mitigation processes that occur when protected data is exposed. The model also includes logic to simulate the security mitigation processes. In certain instances, the security mitigation process successfully removes the protected data from the data stream. As seen in FIG. 3, and described above, the logical 0 attribute bit was not outputted signifying that the security mitigation worked. A user can use this to determine whether a vulnerability exists at this location of the model.

Figure 4:
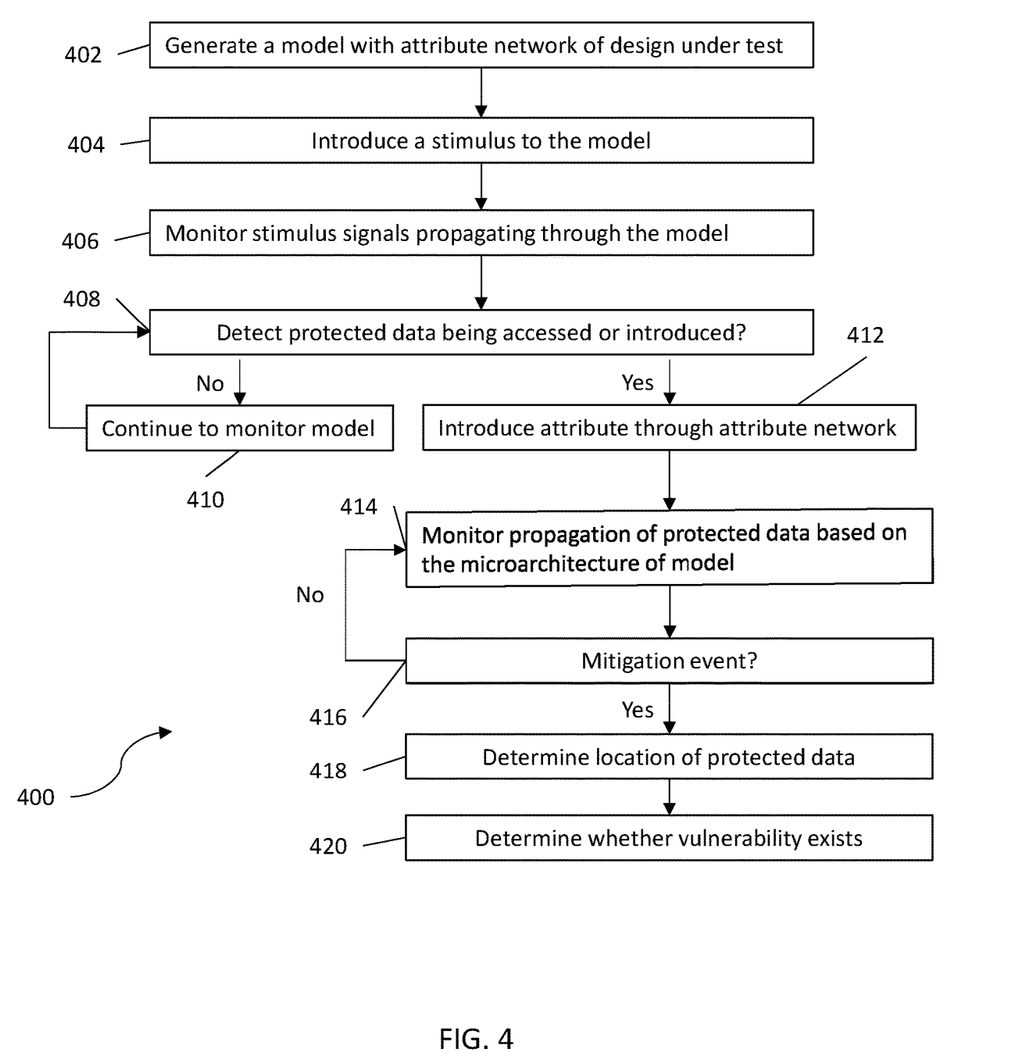
FIG. 4 illustrates a flow diagram of a process for identifying vulnerabilities in accordance with one or more embodiments of the present invention.

Turning now to FIG. 4, a method 400 for identifying vulnerabilities is generally shown in accordance with one or more embodiments of the present invention. At block 402, the system generates a microarchitecture-specific model of the design under test. This model can be generated through any appropriate hardware verification language (HVL). In addition, the system further generates an attribute network to be combined with the model using a model compiler tool. The attribution network is operable to introduce an attribute upon detection of protected data. At block 404, the system introduces a stimulus to the model. The stimulus includes any stimulus necessary to cause the model to operate as the DUT. Additionally, the stimulus includes simulations of any techniques used by bad actors to infiltrate a system. In some instances, multiple stimuli are used to simulate different states of the DUT. The stimulus further includes signals for protected data and unprotected data. At block 406, the system monitors the propagation of the signals through the model. At block 408, the system determines whether protected data is being accessed from or introduced into the model. If the system has not detected any protected data, then the system continues to monitor the signals at block 410.

If the system has detected protected data, the attribute network attaches an attribute to the protected data at block 412. In any system, there can be more than one instance of protected data at a time. Therefore, in some embodiments of the present invention, the attributes include unique attributes for each instance of protected data. In other embodiments of the present invention, different classes of protected data are given different respective attributes. At block 414, the system monitors the propagation of the protected data using the attributes and based on the microarchitecture of the model. At block 416, the system determines whether a security mitigation event has occurred. If no security mitigation event occurs, the system continues to monitor for a security mitigation event at block 414. If a security mitigation event has occurred, the system determines a location of each instance of protected data at block 418. In some instances, a designer may wish to determine the location of any protected data at a given time. In this instance, the system permits the engineer to determine the location prior to the mitigation event. At block 420, the system uses the location of the protected data and the microarchitecture of the model to determine whether a vulnerability exists. Upon identification of the end location of any protected data, the system compares the location and/or path of the protected data and compares it to known system vulnerabilities. In the instance that the model includes a unique design, the system compares the model to another model of a device within a same class as the DUT. In the instance that the end point of the protected or traveled path indicates that a vulnerability exists, the system alerts the individual testing the model. If a vulnerability exists, the design engineers can either modify the microarchitecture of the DUT or perform some other method to resolve the vulnerability.

Figure 5:
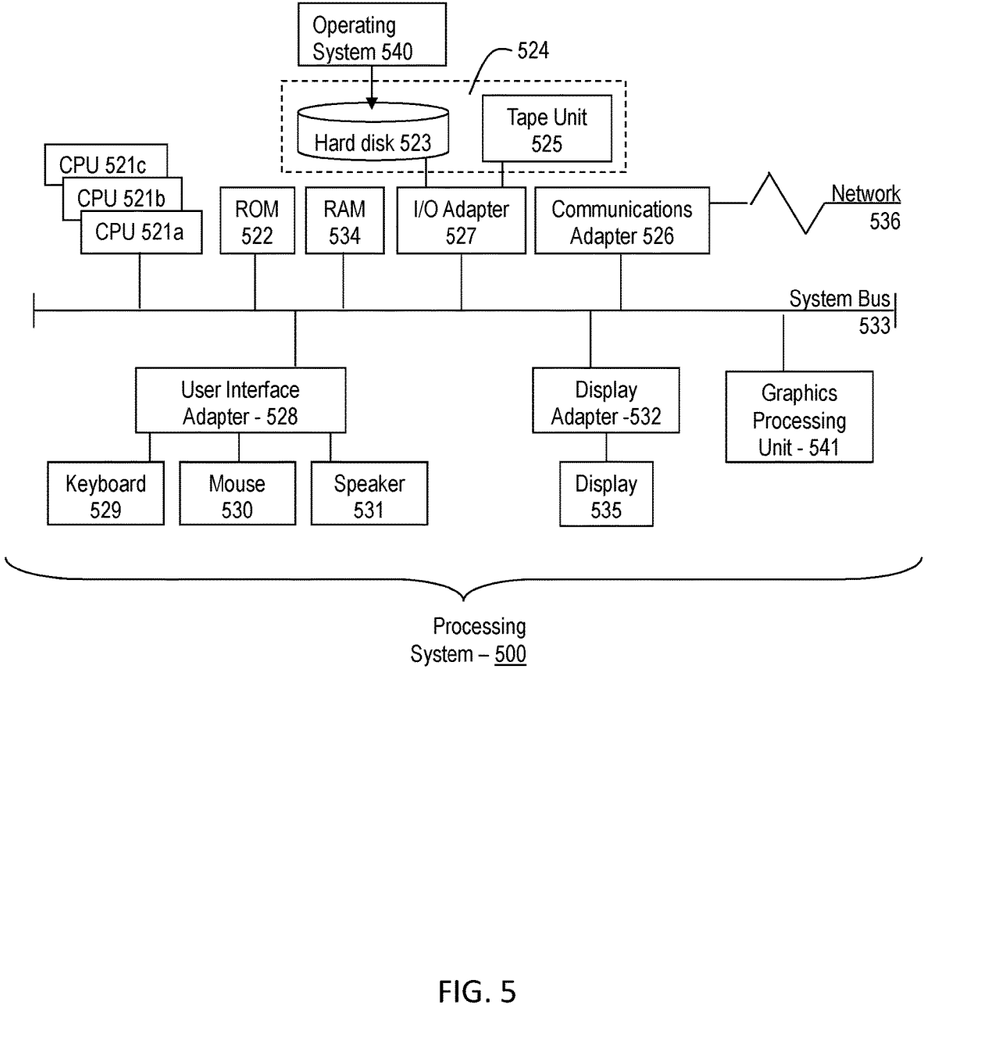
FIG. 5 illustrates a block diagram of a processing system in accordance with one or more embodiments of the present invention.

Turning now to FIG. 5, there is shown an embodiment of a processing system 500 for implementing one or more embodiments of the present invention. In this embodiment, the system 500 has one or more central processing units (processors) 521*a*, 521*b*, 521*c*, etc. (collectively or generically referred to as processor(s) 521). In one or more embodiments of the present invention, each processor 521 may include a reduced instruction set computer (RISC) microprocessor. Processors 521 are coupled to system memory 34 and various other components via a system bus 533. Read only memory (ROM) 522 is coupled to the system bus 533 and may include a basic input/output system (BIOS), which controls certain basic functions of system 500.

FIG. 5 further depicts an input/output (I/O) adapter 527 and a network adapter 526 coupled to the system bus 533. I/O adapter 527 may be a small computer system interface (SCSI) adapter that communicates with a hard disk 523 and/or tape storage drive 525 or any other similar component. I/O adapter 527, hard disk 523, and tape storage device 525 are collectively referred to herein as mass storage 524. Operating system 540 for execution on the processing system 500 may be stored in mass storage 524. A network adapter 526 interconnects bus 533 with an outside network 536 enabling data processing system 500 to communicate with other such systems. A screen (e.g., a display monitor) 535 is connected to system bus 533 by display adaptor 532, which may include a graphics adapter to improve the performance of graphics intensive applications and a video controller. In one embodiment, adapters 527, 526, and 532 may be connected to one or more I/O busses that are connected to system bus 533 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 533 via user interface adapter 528 and display adapter 532. A keyboard 529, mouse 530, and speaker 531 all interconnected to bus 533 via user interface adapter 528, which may include, for example, a Super I/O chip integrating multiple device adapters into a single integrated circuit.

In exemplary embodiments of the present invention, the processing system 500 includes a graphics processing unit 541. Graphics processing unit 541 is a specialized electronic circuit designed to manipulate and alter memory to accelerate the creation of images in a frame buffer intended for output to a display. In general, graphics processing unit 541 is very efficient at manipulating computer graphics and image processing and has a highly parallel structure that makes it more effective than general-purpose CPUs for algorithms where processing of large blocks of data is done in parallel.

Thus, as configured in FIG. 5, the system 500 includes processing capability in the form of processors 521, storage capability including system memory 534 and mass storage 524, input means such as keyboard 529 and mouse 530, and output capability including speaker 531 and display 535. In one embodiment, a portion of system memory 534 and mass storage 524 collectively store an operating system coordinate the functions of the various components shown in FIG. 5.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   generating a model of a device under test, the model comprising a data path similar to the device under test and an attribute network;
   detecting an introduction of protected data into the model;
   marking the protected data with an attribute to track a flow of the protected data along the data path within the device under test in real-time;
   performing security mitigation process based on detecting an exposure of the protected data;
   detecting, upon completion of the security mitigation process, an end point of the marked protected data along the data path; and
   issuing, in response to the end point being indicative of a vulnerability, an alert.

2. The method of claim 1, wherein the data path comprises parallel data paths.

3. The method of claim 1, wherein the protected data is introduced to the model through a stimulus comprising the protected data and unprotected data.

4. The method of claim 1, wherein detecting the introduction of the protected data is in response to an exception occurring in the model.

5. The method of claim 1, wherein the protected data includes a plurality of protected data items and each protected data item includes a respective attribute.

6. The method of claim 5, wherein each respective attribute describes a class of protected data.

7. A system comprising:
   a memory having computer readable instructions; and
   one or more processors for executing the computer readable instructions, the computer readable instructions controlling the one or more processors to perform operations comprising:
   generating a model of a device under test comprising a data path similar to the device under test and an attribute network;
   detecting an introduction of protected data into the model;
   marking the protected data with an attribute to track a flow of the protected data along the data path within the device under test in real-time;
   performing security mitigation process based on detecting an exposure of the protected data;
   detecting, upon completion of the security mitigation process, an end point of the marked protected data along the data path; and
   issuing, in response to the end point being indicative of a vulnerability, an alert.

8. The system of claim 7, wherein the data path comprises parallel data paths.

9. The system of claim 7, wherein the protected data is introduced to the model through a stimulus comprising the protected data and unprotected data.

10. The system of claim 7, wherein detecting the introduction of the protected data is in response to an exception occurring in the model.

11. The system of claim 7, wherein the protected data includes a plurality of protected data items and each protected data item includes a respective attribute.

12. The system of claim 11, wherein each respective attribute describes a class of protected data.

13. A computer program product comprising a computer readable storage medium having program instructions embodied therewith, the program instructions executable by a processor to cause the processor to perform operations comprising:

generating a model of a device under test comprising a data path similar to the device under test and an attribute network;

detecting an introduction of protected data into the model;

marking the protected data with an attribute to track a flow of the protected data along the data path within the device under test in real-time;

performing security mitigation process based on detecting an exposure of the protected data;

detecting, upon completion of the security mitigation process, an end point of the marked protected data along the data path; and issuing, in response to the end point being indicative of a vulnerability, an alert.

14. The computer program product of claim 13, wherein the data path comprises parallel data paths.

15. The computer program product of claim 13, wherein the protected data is introduced to the model through a stimulus comprising protected data and unprotected data.

16. The computer program product of claim 13, wherein detecting the introduction of the protected data is in response to an exception occurring in the model.

17. The computer program product of claim 13, wherein the protected data includes a plurality of protected data items and each protected data item includes a respective attribute.

* * * * *